United States Patent
Hirsch et al.

(10) Patent No.: US 10,222,137 B2
(45) Date of Patent: Mar. 5, 2019

(54) APPARATUS FOR CONDUCTING A FLUID

(71) Applicant: Behr GmbH & Co. KG, Stuttgart (DE)

(72) Inventors: Stefan Hirsch, Stuttgart (DE); Achim Wiebelt, Deidesheim (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 257 days.

(21) Appl. No.: 14/039,292

(22) Filed: Sep. 27, 2013

(65) Prior Publication Data

US 2014/0090824 A1 Apr. 3, 2014

(30) Foreign Application Priority Data

Sep. 28, 2012 (DE) .................. 10 2012 217 874

(51) Int. Cl.
| | |
|---|---|
| *H01M 10/613* | (2014.01) |
| *F28F 3/02* | (2006.01) |
| *F28F 3/12* | (2006.01) |
| *H01M 10/6556* | (2014.01) |
| *F28D 21/00* | (2006.01) |

(52) U.S. Cl.
CPC ............ *F28F 3/022* (2013.01); *F28F 3/12* (2013.01); *H01M 10/613* (2015.04); *H01M 10/6556* (2015.04); *F28D 2021/0043* (2013.01); *F28F 3/027* (2013.01); *F28F 2275/025* (2013.01)

(58) Field of Classification Search
CPC ...... F28F 3/12; F28F 3/14; F28F 3/027; F28F 13/003; H01M 10/613; H05K 7/20927; H01L 23/473

USPC .................................. 165/79, 170, 177, 183
See application file for complete search history.

(56) References Cited

U.S. PATENT DOCUMENTS

| | | | | |
|---|---|---|---|---|
| 3,313,343 | A | * | 4/1967 | Ware .................. F28F 3/022 165/166 |
| 3,327,776 | A | * | 6/1967 | Butt .......................... 165/80.4 |
| 4,771,826 | A | * | 9/1988 | Grehier ............... F28D 9/0037 165/166 |
| 5,934,364 | A | * | 8/1999 | Chrysler et al. .............. 165/170 |

(Continued)

FOREIGN PATENT DOCUMENTS

| | | |
|---|---|---|
| CN | 1636126 A | 7/2005 |
| DE | 10 2005 040 611 A1 | 3/2007 |

(Continued)

OTHER PUBLICATIONS

Polishchuk, RU2044987TRANS (English Translation), Sep. 1995.*

(Continued)

*Primary Examiner* — Eric Ruppert
(74) *Attorney, Agent, or Firm* — Paul D. Strain, Esq.; Strain & Strain PLLC

(57) ABSTRACT

The invention relates to an apparatus for conducting a fluid, in particular a cooling fluid for cooling components to be cooled, in particular for cooling electronics components and/or battery cells and/or battery modules, having a first covering plate and a second covering plate and having a structural mesh between the two covering plates for defining a spatial region, through which flow can pass, a division being provided by reshaping of the structural mesh and/or by introduction of a sealant for at least partially sealing the spatial region with respect to an outer space and/or for dividing the spatial region into definable flow channels.

14 Claims, 1 Drawing Sheet

(56) References Cited

U.S. PATENT DOCUMENTS

| | | |
|---|---|---|
| 7,036,572 B2 | 5/2006 | Sohn |
| 2003/0164233 A1* | 9/2003 | Wu ................... F28D 1/0308 165/166 |
| 2003/0227732 A1* | 12/2003 | Dessiatoun ........... H01L 23/427 361/103 |
| 2007/0153480 A1* | 7/2007 | Zhang ..................... C09K 5/04 361/700 |
| 2007/0240863 A1 | 10/2007 | Kim et al. |
| 2011/0138850 A1* | 6/2011 | Suzuki et al. ................... 62/524 |
| 2012/0193077 A1* | 8/2012 | Choi ..................... F28F 13/12 165/109.1 |

FOREIGN PATENT DOCUMENTS

| | | | | |
|---|---|---|---|---|
| DE | 102007001437 | * | 7/2008 | ......... F28D 1/05366 |
| DE | 10 2010 013 025 A1 | | 9/2011 | |
| DE | 11 2011 103 338 T5 | | 7/2013 | |
| RU | 2044987 | * | 9/1995 | |
| WO | WO 2011021820 | * | 2/2011 | .............. F28F 3/027 |
| WO | WO 2013/101737 A1 | | 7/2013 | |

OTHER PUBLICATIONS

Porex, Ethyl Vinyl Acetate, Oct. 2011.*
Auchter, DE102007001437TRANS (English Translation), Jul. 2008.*
German Search Report, Application No. DE 10 2012 217 874.0, dated Jul. 31, 2013, 8 pgs.

* cited by examiner

APPARATUS FOR CONDUCTING A FLUID

CROSS-REFERENCE TO RELATED PATENT APPLICATIONS

This application is based upon and claims the benefit of priority from prior German Patent Application No. 10 2012 217 874.0, filed Sep. 28, 2012, the entire contents of which are incorporated herein by reference in their entirety.

TECHNICAL FIELD

The invention relates to an apparatus for conducting a fluid, such as a cooling fluid for cooling components to be cooled, in particular for cooling electronics components and/or battery cells and/or battery modules.

PRIOR ART

An apparatus for conducting a cooling fluid for cooling components to be cooled has been disclosed in the prior art, for example, by DE 10 2010 013 025 A1. Here, a pipeline is arranged between two covering plates, which pipeline is shaped in a serpentine-like manner, is received in a groove of the bottom-side covering plate and serves for the throughflow of the cooling fluid.

Apparatuses of this type are complicated to produce.

SUMMARY OF THE INVENTION, OBJECT, ACHIEVEMENT, ADVANTAGES

It is therefore the object of the present invention to provide an apparatus for conducting a fluid, which apparatus has satisfactory heat dissipation of components to be cooled and is nevertheless simple to produce.

The object of the present invention is achieved by an apparatus for conducting a fluid having the features according to Claim 1.

One exemplary embodiment of the invention relates to an apparatus for conducting a fluid, in particular a cooling fluid for cooling components to be cooled, in particular for cooling electronics components and/or battery cells and/or battery modules, having a first covering plate and a second covering plate and having a structural mesh between the two covering plates for defining a spatial region, through which flow can pass, a division being provided by reshaping of the structural mesh and/or by introduction of a sealant for at least partially sealing the spatial region with respect to an outer space and/or for dividing the spatial region into definable flow channels.

In one exemplary embodiment, the heat exchanger according to the invention serves to control the temperature of an energy store.

This has the advantage that the structural mesh can be designed very flexibly. Thus, for example, it can be arranged in one piece between an upper and a lower covering plate. Nevertheless, flow channels can be produced here in a very simple way by the introduction of the sealant and/or by edge sealing. There is therefore the general advantage here that a heat exchanger can be produced by means of only three different components, namely by way of the structural mesh, covering plates and a sealant.

It is advantageous if the structural mesh is a three-dimensional mesh which is formed from wire and/or sheet made from metal, glass fibers, carbon fibers and/or plastic. A wire mesh or a sheet mesh can be readily manufactured here. A mesh of this type can also be reshaped satisfactorily.

A plastic mesh would be simple to produce by way of injection molding methods, which would bring about simple production. The provision of glass fibers or carbon fibers would improve the thermal conductivity properties.

It is also expedient if the structural mesh is a stamped and/or punched and/or reshaped wire material or metal sheet. This can be reshaped simply by way of punching or stamping.

It is also expedient if at least one of the covering plates is formed from metal, plastic, plastic composite film and/or from plastic composite panel. In the case of a covering plate made from plastic, an adhesive bonding or fusing process can be advantageous. In the case of a metal sheet, a soldering process can also be provided.

It is expedient here if the structural mesh is connected, such as is adhesively bonded and/or fused and/or soldered, to at least one of the covering plates. Both covering plates are advantageously connected to the structural mesh. Here, however, a covering plate made from metal can also be soldered, whereas the second covering plate made from plastic can also be fused and/or adhesively bonded. A covering plate made from metal or plastic can also be adhesively bonded and/or fused, whereas the second covering plate made from metal or plastic can be adhesively bonded and/or fused. As an alternative, both covering plates can be soldered or adhesively bonded. Both plates made from plastic can also be adhesively bonded and/or fused.

Here, the covering plate made from plastic can be composed as solid plastic or can be formed as a film; it can also be formed as a plastic composite panel with a metal foil, such as aluminum foil, etc., or with a fiber reinforced layer.

It is advantageous if a fluid inlet and a fluid outlet are provided, a fluid outlet being provided on one of the covering plates and a fluid outlet being provided on one of the covering plates, it being possible for the fluid inlet and the fluid outlet to be provided on the same covering plate or on different covering plates.

It is advantageous here if the fluid inlet and/or the fluid outlet are/is configured as a stub which is provided on one of the covering plates. As a result, a favorable connection to a line system can be provided.

It is also expedient if the stub is received in an opening of a covering plate or is molded onto the covering plate.

Furthermore, it is expedient if the sealant is a sealing and/or adhesive compound, is advantageously a hydrolysis-resistant sealing and/or adhesive compound. As a result, injection of the sealant or adhesive as a sealing or adhesive track or a sealing or adhesive bead is possible, with the result that a wall is formed which separates the outer space from the inner space or which can define a fluid channel as wall.

It is advantageous if the sealant can be injected at least into part of the spatial region, it being possible for said part region to be filled completely or partially.

It is advantageous if at least one continuous flow channel or a plurality of flow channels which are separate from one another or are connected to one another are provided for the throughflow of a fluid.

It is also expedient if at least two flow channels which are separate from one another are provided for the separate throughflow of two fluids. As a result, a heat exchanger can also be formed which exchange heat in the apparatus.

Advantageous developments of the present invention are described in the subclaims and the following description of the figures.

BRIEF DESCRIPTION OF THE DRAWINGS

In the following text, the invention will be explained in detail using one exemplary embodiment with reference to a drawing, in which.

PREFERRED EMBODIMENT OF THE INVENTION

Figure 1:
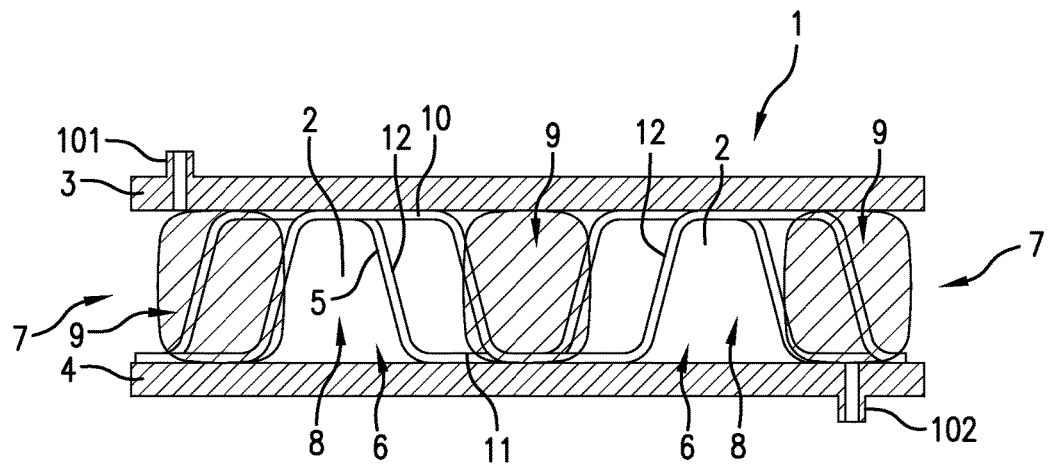
FIG. 1 shows a diagrammatic sectional view of an apparatus for conducting a fluid.

FIG. 1 shows an apparatus 1 according to the invention for conducting a fluid, in particular a cooling fluid 2 for cooling components to be cooled. The apparatus 1 is provided with a first covering plate 3 and a second covering plate 4 and with a structural mesh 5 between the two covering plates 3, 4. A spatial region 6, through which flow can pass, is defined by the covering plates 3, 4 being placed onto the structural mesh 5.

The spatial region 6, through which flow can pass, is provided with a division 9 for sealing the spatial region 6 off from an outer space 7 and/or for dividing the spatial region into flow channels 8. The division 9 can be provided as a reshaped portion of the structural mesh 5 and/or the provision of a sealant.

In the exemplary embodiment of FIG. 1, a components to be cooled can be, for example, an electronics components and/or a battery cells and/or a battery module which is in thermal contact with one of the covering plates.

Here, the structural mesh 5 has planar regions 10, 11 which are oriented substantially parallel to a plane of the covering plates 3, 4. Webs 12 which connect said planar regions 10, 11 to one another are provided between said planar regions 10, 11.

The apparatus 1 for conducting at least one fluid, also suitable as a heat exchanger for conducting two fluids, advantageously has a structural mesh 5 which is preferably produced from a metallic material, such as from a wire fabric or a structured metal sheet. Said structural mesh 5 advantageously has a high strength, with the result that it withstands tensile forces which acts on the structural mesh on account of internal pressure in the apparatus or external pressure on the apparatus 1.

The covering plates 3, 4 are preferably composed of plastic or metal. They are connected to the structural mesh 5. The fluid inlet and fluid outlet (101, 102) may be formed as stubs.

The lateral sealing of the unit, comprising covering plate 3, structural mesh 5, covering plate 4, and the design of the fluid conducting means, such as flow dividers, parallel flutes and/or deflection means, are achieved either by targeted introduction of reshaped portions into the structural mesh and/or by targeted introduction of sealant and/or adhesive. The latter can be, for example, a hydrolysis-resistant adhesive or sealant which is introduced into the structural mesh or into a combination of structural mesh and reshaped portion. Here, a fluid-tight chamber is produced, for receiving a cooling or heating medium, for example coolant. It is advantageously provided here that at least one of the covering plates is in thermal contact with at least one of the components to be cooled or to be heated, such as an electric component, for example battery cell.

The covering plates 3, 4 being composed of plastic or of a material composite, for example a plastic/aluminum/plastic composite, or of a plastic which is reinforced with fibers or woven fabrics, for example glass or carbon fibers, for example an organosheet, the material thickness of at least one plate lying in the range from 0.2 to 1 mm, and the plastic having as high a coefficient of heat conductivity as possible, for example by way of suitable filler materials. However, a high dielectric strength is advantageous for safe electric insulation.

The structural mesh and at least one covering plate can be joined via a thermal process, for example by the structural mesh being fused partially into the covering plates or by them being welded to one another.

The structural mesh and at least one of the covering plates can be joined to one another via an adhesive bonding process. The structural mesh 5 is preferably produced from a metallic sheet by punching and reshaping.

Figure 2:
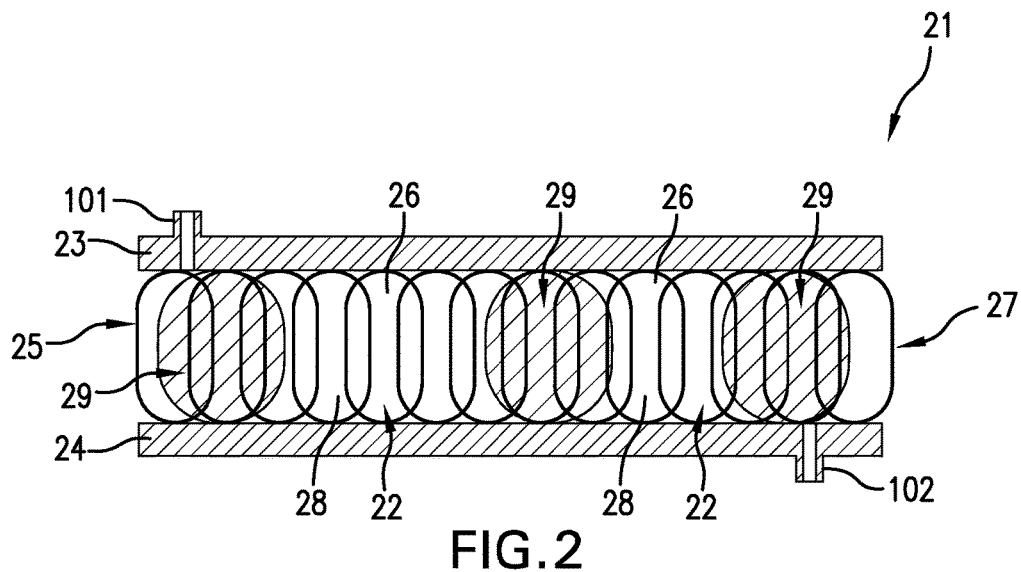
FIG. 2 shows a diagrammatic sectional view of an alternative apparatus for conducting a fluid.

Here, the structural mesh is preferably produced as a three-dimensional mesh from a metallic wire. FIG. 2 shows an apparatus 21 according to the invention for conducting a fluid, in particular a cooling fluid 22 for cooling components to be cooled. The apparatus 21 is provided with a first covering plate 23 and a second covering plate 24 and with a structural mesh 25 between the two covering plates 23, 24. A spatial region 26, through which flow can pass, is defined by the covering plates 23, 24 being placed onto the structural mesh 25.

The spatial region 26, through which flow can pass, is provided with a division 29 for sealing the spatial region 26 off from an outer space 27 and/or for dividing the spatial region into flow channels 28. The division 29 can be provided as a reshaped portion of the structural mesh 25 and/or the provision of a sealant. The structural mesh 25 is formed as a wire structure.

The apparatus has connector stubs which are configured in one piece with a covering plate or are plugged into an opening or are molded onto at least one covering plate or are adhesively bonded as separate components into at least one covering plate.

The apparatus 1, 21 is preferably a battery cooler. The apparatus can also be a heat exchanger for conducting two fluids.

The invention claimed is:

1. An apparatus for conducting a fluid, comprising:
   an electrically insulating first covering plate and an electrically insulating second covering plate, wherein the first covering plate or the second covering plate directly abut an electronic component,
   a structural mesh between the first covering plate and the second covering plate for defining a spatial region,
   a first division that seals the spatial region with respect to an outer space outside the apparatus and a second division that divides the spatial region inside the apparatus to produce definable flow channels, through which a flow can pass,
   wherein the first division and second division consist essentially of a sealant and the structural mesh,
   wherein the sealant is selected from the group consisting of a hydrolysis-resistant sealing compound and an adhesive compound,
   wherein the first covering plate and the second covering plate comprise a composite material selected from the group consisting of plastic/metal/plastic composite and a plastic reinforced with fibers or woven fabrics,
   wherein the structural mesh is a three-dimensional mesh formed from a metallic wire or from a carbon fiber or a glass fiber,
   wherein the structural mesh is fused to the first covering plate and the second covering plate.

2. The apparatus according to claim 1,
   wherein the structural mesh is a three-dimensional mesh formed from a metallic wire.

3. The apparatus according to claim 1,
wherein at least one of the first covering plate or the second covering plate is formed from a material selected from the group consisting of metal, plastic, plastic composite film, and plastic composite panel.

4. The apparatus according to claim 1, further comprising a fluid inlet and a fluid outlet,
wherein the fluid inlet and the fluid outlet are both arranged on one of the first covering plate or the second covering plate.

5. The apparatus according to claim 4,
wherein the fluid inlet or the fluid outlet is configured as a stub which is provided on one of the first covering plate or the second covering plate.

6. The apparatus according to claim 5,
wherein the stub is received in an opening of a covering plate or is molded onto the covering plate.

7. The apparatus according to claim 1,
wherein the sealant is injected at least into part of the spatial region, wherein the part of the spatial region is filled at least partially.

8. The apparatus according to claim 1,
wherein at least one continuous flow channel or a plurality of flow channels which are separate from one another or are connected to one another are provided to conduct a throughflow of the fluid.

9. The apparatus according to claim 1,
wherein at least two flow channels which are separate from one another are provided to conduct a separate throughflow of two fluids.

10. The apparatus according to claim 1, further comprising a fluid inlet and a fluid outlet,
wherein the fluid inlet is arranged on either the first covering plate or the second covering plate and the fluid outlet is arranged on the other of the first covering plate or the second covering plate, such that the fluid inlet and fluid outlet are not arranged on the same covering plate.

11. An apparatus for conducting a fluid, consisting essentially of:
an electrically insulating first covering plate and an electrically insulating second covering plate, wherein the first covering plate or the second covering plate directly abut an electronic component, wherein the electronic component is a battery cell or battery module,
a structural mesh between the first covering plate and the second covering plate for defining a spatial region,
a first division that seals the spatial region with respect to an outer space outside the apparatus and a second division that divides the spatial region inside the apparatus to produce definable flow channels, through which a flow can pass,
wherein the first division and second division consist essentially of a sealant and the structural mesh,
wherein the sealant is selected from the group consisting of a hydrolysis-resistant sealing compound and an adhesive compound,
wherein the structural mesh is a three-dimensional mesh structure formed from a metallic wire or from a carbon fiber or a glass fiber,
wherein the structural mesh is fused to the first covering plate and the second covering plate.

12. The apparatus for conducting a fluid according to claim 11,
wherein the first covering plate and the second covering plate comprise a layered composite material having a plastic/metal/plastic structure.

13. The apparatus according to claim 12,
wherein the structural mesh is a three-dimensional mesh formed from a metallic wire.

14. An apparatus for conducting a fluid, comprising:
an electrically insulating first covering plate and an electrically insulating second covering plate, wherein the first covering plate or the second covering plate directly abut an electronic component, wherein the electronic component is a battery cell or battery module,
a structural mesh between the first covering plate and the second covering plate for defining a spatial region, a first division that seals the spatial region with respect to an outer space outside the apparatus and a second division that divides the spatial region inside the apparatus to produce definable flow channels, through which a flow can pass,
a fluid inlet and a fluid outlet, wherein the fluid inlet and the fluid outlet are both arranged on one of the first covering plate or the second covering plate,
wherein the first division and second division consist of a sealant and the structural mesh,
wherein the sealant is selected from the group consisting of a hydrolysis-resistant sealing compound and an adhesive compound,
wherein the first covering plate and the second covering plate comprise a layered composite material having a plastic/metal/plastic structure,
wherein the structural mesh is formed from a metallic wire, wherein the structural mesh is connected to at least one of the first covering plate or the second covering plate, wherein the structural mesh is fused to the first covering plate or the second covering plate,
wherein at least two flow channels which are separate from one another are provided to conduct a separate throughflow of two fluids.

\* \* \* \* \*